J. H. BANKA.
LOCK FOR AXLE NUTS.
APPLICATION FILED MAR. 30, 1916.
1,229,701.
Patented June 12, 1917.
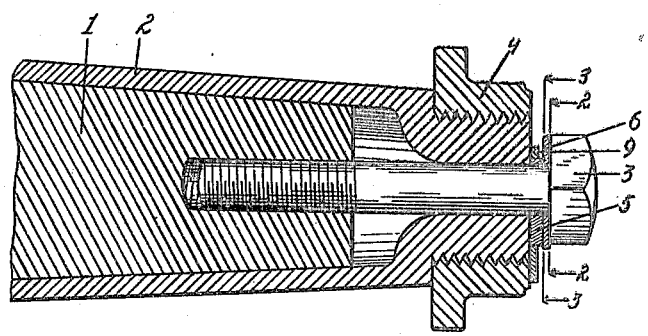
Fig. I.
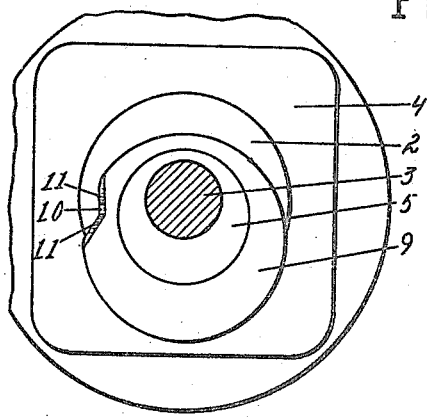
Fig. III.
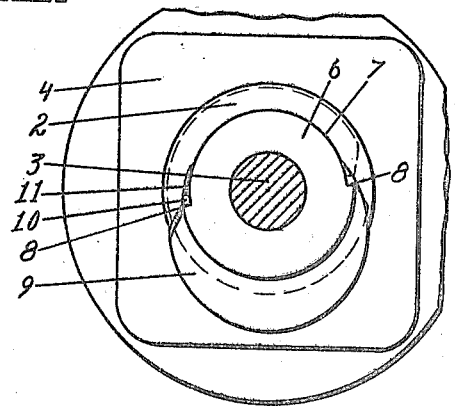
Fig. II.
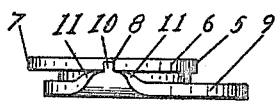
Fig. IV.
WITNESSES:
Luther Blake
Morris Stinson
INVENTOR.
John H. Banka
BY Chappell & Earl
ATTORNEYS.

UNITED STATES PATENT OFFICE.

JOHN H. BANKA, OF BATTLE CREEK, MICHIGAN.

LOCK FOR AXLE-NUTS.

1,229,701.   Specification of Letters Patent.   Patented June 12, 1917.

Application filed March 30, 1916. Serial No. 87,734.

*To all whom it may concern:*

Be it known that I, JOHN H. BANKA, a citizen of the United States, residing at the city of Battle Creek, in the county of Calhoun and State of Michigan, have invented certain new and useful Improvements in Locks for Axle-Nuts, of which the following is a specification.

This invention relates to improvements in locks for axle nuts.

The main objects of this invention are:

First, to provide an improved lock for axle nuts which may be readily applied to wagon and carriage axles of common type.

Second, to provide an improved lock for axle nuts which is very secure when adjusted to locking position and easily adjusted to release or lock the nut.

Further objects, and objects relating to details and economies of construction and operation will definitely appear from the detailed description to follow.

I accomplish the objects of my invention by the devices and means described in the following specification. The invention is clearly illustrated in the accompanying drawing forming a part of this specification, in which:

Figure I is a detail longitudinal section of an axle embodying the features of my invention, the skein retaining bolt being shown in full lines.

Fig. II is a detail section on line corresponding to line 2—2 of Fig. I, a hub being shown in conventional form, the parts being shown in locked position in full lines, and in unlocked position by dotted lines.

Fig. III is a detail section on line corresponding to line 3—3 of Fig. I.

Fig. IV is an edge view of the locking parts removed from the bolt.

In the drawing, similar reference characters refer to similar parts throughout the several views, and the sectional views are taken looking in the direction of the little arrows at the ends of the section lines.

Referring to the drawing, 1 represents the arm of an axle and 2 the axle skein. The skein is retained on the arm by the bolt 3 which is tapped into the end of the arm. The skein is provided with the wheel retaining nut 4. These parts are of the well known type commonly employed in carriages and wagons. On the bolt 3 is an eccentric disk-like collar 5 and a stop disk 6, the stop disk being provided with a peripheral notch 7, the ends of which form stops 8. This notch embraces one half of the circumference of the disk. The locking disk 9 is eccentrically mounted on the collar 5 for rotative adjustment thereon so that when adjusted to the position shown by full lines in Figs. I, II and III, it overlaps the nut 4 preventing its being unscrewed. When adjusted to the position shown by dotted lines in Fig. II it lies within the circle of the bore of the nut permitting the nut to be unscrewed and withdrawn over it. The locking disk is provided with a stop 10 which projects into the notch 7 in the stop disk 6 to coact with the stops 8 at the ends thereof, thus limiting the turning out of the locking disk, the stops 8 being positioned so that when the stop 10 is against one stop the locking disk is in disengaged position, and when against the other it is in engaged position.

The locking disk is preferably provided with a double faced cam 11, which engages the stop disk when the locking disk is adjusted to either its locking or disengaged positions, the lug 10 being an extension of this cam. This provides a simple and efficient means of retaining the locking disk in either position. The parts are, however, preferably arranged so that when the locking disk is in locking position gravity tends to hold it in that position.

My improved device is adapted for application to the axles of vehicles of a structure or type in quite common use and it can be applied either as an attachment by the user or by the manufacturer in assembling the vehicle. The structure is very simple and economical to produce and at the same time efficient and is very convenient to manipulate.

Having thus described my invention, what I claim as new and desire to secure by Letters Patent, is:

1. The combination of an axle arm, of an axle skein therefor, an axle nut threaded on said skein, an axle skein retaining bolt threaded into said arm, an eccentric collar and a stop disk arranged on said bolt, said stop disk being provided with a segmental notch, the ends of the notch constituting stops, and a locking disk eccentrically mounted on said collar for rotative adjustment thereon so that when adjusted to one position it overlaps said axle nut and when adjusted to another position it lies within the circle of its bore, said locking disk being provided with a double cam terminating in a stop lug projecting into the notch of said stop disk to coact with said stops thereof, the cam being adapted to engage said disk when said stop lug is engaged with either stop of said stop disk.

2. The combination of a nut, a support member projecting beyond the nut, an eccentric collar and a stop disk arranged on said support member, said stop disk being provided with a segmental notch, the ends of the notch constituting stops, and a locking disk eccentrically mounted on said collar for rotative adjustment thereon so that when adjusted to one position it lies within the circle of its bore, said locking disk being provided with a double cam terminating in a stop lug projecting into the notch of said stop disk to coact with said stops thereof, the cams being adapted to engage said disk when said stop lug is engaged with either stop of said stop disk.

3. The combination of a nut, a support member projecting beyond the nut, an eccentric collar and a stop disk arranged on said support member, said stop disk being provided with a pair of stops, and a locking disk eccentrically mounted on said collar for rotative adjustment thereon so that when adjusted to one position it overlaps said nut and when adjusted to another position it lies within the circle of its bore, said locking disk being provided with a stop lug coacting with the stops of said stop disk and with a cam adapted to engage said stop disk when said stop lug is engaged with either stop of said stop disk.

In witness whereof, I have hereunto set my hand and seal in the presence of two witnesses.

JOHN H. BANKA. [L. S.]

Witnesses:
 ROY KENDALL,
 MARK L. BLAKESLEE.

Copies of this patent may be obtained for five cents each, by addressing the "Commissioner of Patents, Washington, D. C."